Jan. 11, 1938. H. P. TROENDLY 2,105,276
SUPPORT FOR LAWN SPRINKLERS
Original Filed April 19, 1933
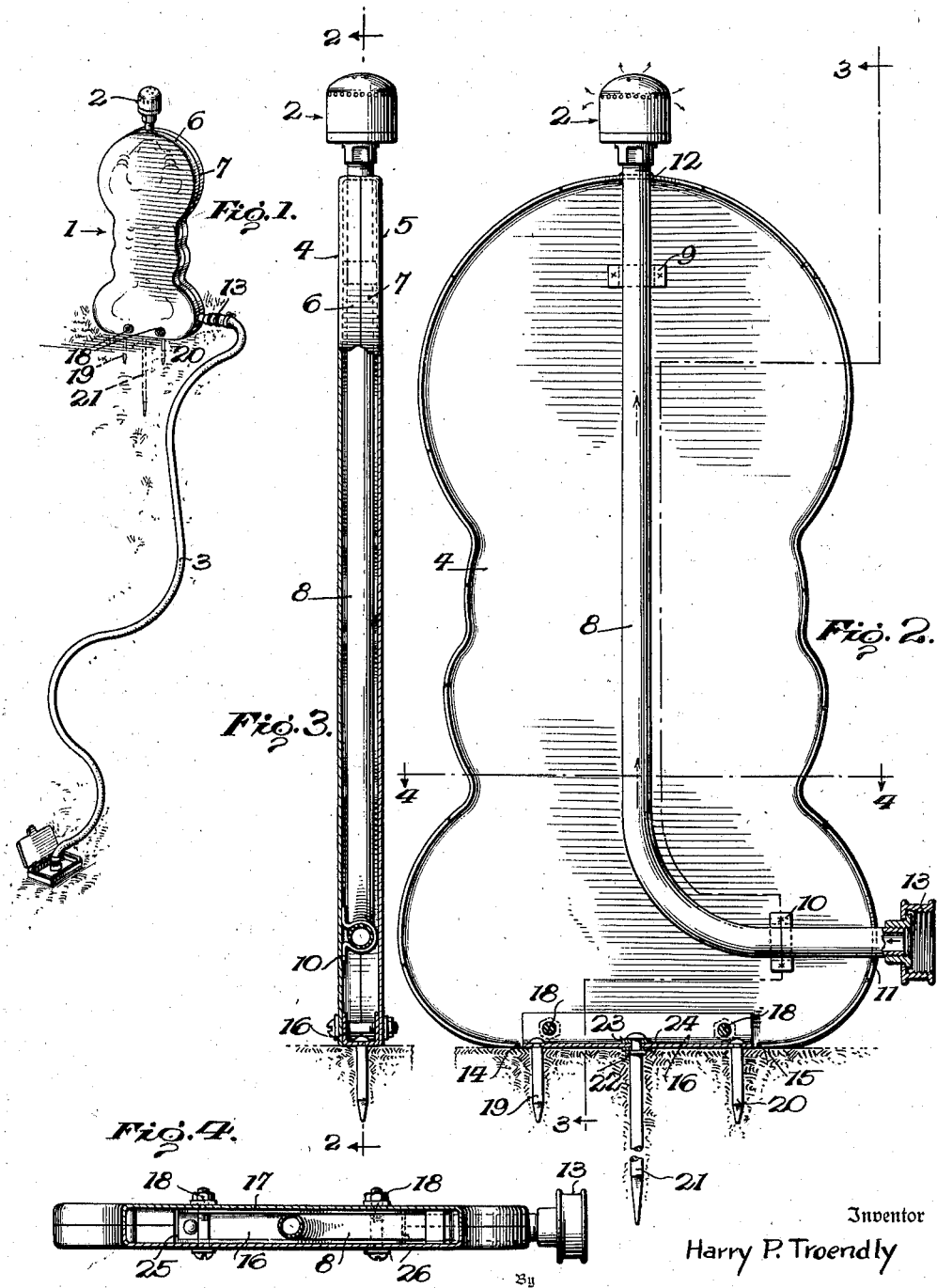
Inventor
Harry P. Troendly
By Samuel Scrivener Jr.
Attorney Patented Jan. 11, 1938

2,105,276

UNITED STATES PATENT OFFICE 2,105,276

SUPPORT FOR LAWN SPRINKLERS

Harry P. Troendly, New York, N. Y., assignor, by mesne assignments, to Samuel Scrivener, Jr., Washington, D. C.

Application April 19, 1933, Serial No. 666,907
Renewed May 16, 1936

4 Claims. (Cl. 248—87)

The present invention relates to lawn sprinkling devices and more particularly to devices for supporting a lawn sprinkler.

An object of this invention is to provide a support for a lawn sprinkler which will include means for preventing any turning of the support due to the reaction of the streams issued from the sprinkler.

Another object of the invention is to provide a support for a sprinkler which will include means whereby the support and sprinkler may be easily attached to the ground but which will prevent any undesired movement of the sprinkler with respect to the ground.

Another object of the invention is to provide a device which will insure a rigid and sure support for a sprinkler.

Another object is to provide a support for a sprinkler which may be formed from parts which are easily and cheaply made and quickly assembled but which will be strong and durable.

Other objects and features of novelty will be apparent from the following description and drawing, it being expressly understood, however, that the invention is in no way limited by such description and drawing or otherwise than by the appended claims.

Referring to the drawing in which similar reference numerals denote like parts;

Fig. 1 is a perspective view of the subject of the invention showing the same mounted on the ground and attached to a hose;

Fig. 2 is a view of parts of the invention, taken on the line 2—2 of Fig. 3;

Fig. 3 is a view, partly in section, taken on the line 3—3 of Fig. 2, and

Fig. 4 is a view taken on the line 4—4 of Fig. 2.

Referring particularly to Fig. 1 of the drawing, it will be seen that a supporting device, generally designated by the numeral 1, has been provided and which is adapted to support a sprinkler head 2 in a position above the ground, it being noted that such sprinkler head forms no part of the present invention and that any type of sprinkler, whether rotary or stationary, may be employed. A hose 3 may be connected through the sprinkler support to the head 2 in a manner to be described more fully hereinafter.

The supporting device 1, forming the subject of the present invention, comprises two stamped metal shells 4, 5 which may be of any desired shape and each of which comprises a plate-like portion and an integral marginal flange, designated by numerals 6, 7. A pipe 8, to the upper end of which the sprinkler head 2 may be connected, is attached to one of the shells 4, 5 by any suitable means such, for example, as the metal straps 9, 10 which may be bent over the pipe and the ends of which may be attached, as by welding, to the stamped shell. An opening is formed in the flange of each shell near the lower portion thereof as at 11, and such openings are so disposed that when the shells are brought together in assembling the support they cooperate to form a port through which the pipe 8 is passed. Similar openings are provided in the upper part of the flange of each shell, as at 12, in order to provide a port through which the upper portion of pipe 8 passes. If desired, the shells may be soldered or welded to the pipe at the points where it passes through the same. A coupling 13 of usual type may be attached to the lower end of the pipe.

Referring particularly to Fig. 2 it will be seen that each flange is completely cut away as at 14, 15 at the lower part of the shell and throughout approximately the entire ground-engaging extent of such lower part. There is thus provided an opening 17 in the wall of each shell for a purpose which will appear hereinafter.

In assembling the support, the two stamped metal shells, with the pipe 8 attached to the interior of one of them, are brought together with the marginal edges of the flanges abutting, and the shells are attached together as by spot-welding along the line of abutment of the flanges, or by bolting, riveting or otherwise. It will thus be seen that a rigid metal support or cover for the pipe has been provided, to which the pipe is rigidly and permanently attached.

Means are provided by the invention for securing the support to the ground, and such means comprise a U-shaped bracket member 16 having a length slightly shorter than the opening 17 provided in the support by cutting away the flanges as at 14, 15. The bracket 16 is inserted into the opening 17 between the walls of the stamped metal shells and is attached to such walls by any suitable means such as welding, bolting, riveting, etc., the bolts 18 being shown in the drawing. Attached to the bottom of the U-shaped bracket 16 adjacent the ends thereof, and so disposed as to be suitable for engaging the ground, are a plurality of relatively short spikes 19, 20. These spikes may be attached to the bottom of the U-shaped bracket in any suitable manner, but are shown as being provided with reduced portions at the upper ends thereof, which reduced portions are passed through holes in the bottom of the bracket and then deformed to provide a rigid and secure fastening. Midway of the length of the bracket there is provided a relatively long spike 21, the same being provided at its upper end with a collar 22 and a reduced portion which is passed through an opening formed in the bottom of the bracket and then deformed to provide a rigid and secure fastening. Washers 23, 24 may be provided between the collar 22 and the bottom of the bracket and between the deformed head and the bottom of the bracket in order to provide a more secure fastening.

The short spikes 19, 20 are provided for the purpose of preventing turning of the sprinkler support and are therefore placed at the opposite extremities of the bracket 16. The longer spike 21 is provided for the purpose of attaching the support securely to the ground. The provision of shorter spikes for preventing turning of the support insures that the entire spike assembly may be easily inserted into the ground.

It will be seen from the drawing that the opening 17 in the bottom of the support is slightly longer than the bracket 16, whereby small openings 25, 26 are provided at each end of the bracket 16. These openings allow any moisture or water which may collect within the support to drain to the ground.

While one modification of my invention has been illustrated and described in the present application, it will be apparent to those skilled in the art that modifications and changes may be made therein without departing in any way from the spirit of the invention, for the limits of which reference must be had to the appended claims.

What is claimed is:

1. A support for a lawn sprinkler comprising a plurality of plate-like members having marginal flanges thereon, said flanges being connected together to form a hollow body, a pipe arranged within said body and adapted to act as a water conduit, and ground-engaging means connected to said body.

2. A support for a lawn sprinkler comprising a plurality of side members, connected marginal flanges on said side members having openings therein through which a pipe is adapted to pass, a bracket having side walls secured to said side members, a plurality of relatively short spikes attached to said bracket, and a relatively long spike attached to said bracket.

3. A support for a lawn sprinkler comprising two stamped metal members, flanges on said members, said flanges being welded together to form with said members a hollow body, a pipe extending interiorly through said body and being attached to one of said members, a bracket disposed within said body, and ground-engaging means carried by said bracket.

4. A support for a lawn sprinkler comprising a plate-like member, an integral marginal flange on said member having openings therein, a pipe extending through certain of said openings, metallic straps extending across said pipe and welded to said plate-like member, and a bracket member disposed in another of said openings.

HARRY P. TROENDLY.